United States Patent Office

3,109,705
Patented Nov. 5, 1963

3,109,705
PRODUCTION OF A NON-CAKING BORAX
Leo C. Schmitt, Trona, Calif., assignor to American Potash & Chemical Corporation, a corporation of Delaware
No Drawing. Filed Oct. 3, 1960, Ser. No. 59,859
5 Claims. (Cl. 23—59)

This invention relates in general to a method for rendering crystalline sodium tetraborate decahydrate free flowing over extended time periods, and more particularly to a method of the type mentioned which is believed to result in the formation of a film of sodium pentaborate decahydrate on the surface of sodium tetraborate decahydrate so as to retard the dehydration of the latter.

Borax, sodium tetraborate decahydrate in its normal commercially available form, is known to cake during storage. It is believed that this is due to dehydration and the subsequent evaporation of the water of hydration, thus resulting in interlocking of adjacent crystals.

Various methods have been tried to prevent borax from caking, the most common of these involving the coating of the borax crystal surface with a finely divided, moisture-absorbant or hydrophobic material or organic surfactant. None of these methods has been entirely satisfactory and all of them introduce an impurity into the product.

It is an object of this invention to provide a method for preventing borax from caking which, in its preferred embodiment, eliminates the introduction of an impurity into the product.

Other objects and advantages, if not specifically set forth, will become apparent in the course of the description which follows.

Generally, it has now been found that borax in its crystalline sodium tetraborate decahydrate form may be rendered more or less permanently free-flowing if the material, in the form of a filter cake or in the dry crystalline form, is treated with an aqueous solution of an acid having a pH of less than 5.5, the acid being one of those acids capable of reacting with sodium tetraborate to form sodium pentaborate.

More particularly, it has been found that when the hydrated sodium tetraborate is treated with between about 3% and 30%, by weight, and preferably between about 6% and 10%, by weight, of an aqueous solution containing between about 0.5% and 5% of an acid capable of reacting with borax to form sodium pentaborate decahydrate ($Na_2B_{10}O_{16} \cdot 10H_2O$) and which, in the aqueous solution, has a pH of less than 5.5, a borax product is formed which exhibits non-caking properties. This is believed to be due to the fact that a stable film of sodium pentaborate decahydrate forms in the borax crystal surface, thus retarding dehydration and hence the caking of the borax.

The mechanism may be represented generally by the following equation:

$$5Na_2B_4O_7 \cdot 10H_2O + XH_yA$$
$$= 2Na_2B_{10}O_{16} \cdot 10H_2O + 33H_2O + XNa_yA$$

Where boric acid, a preferred species, is used the equation becomes:

$$Na_2B_4O_7 \cdot 10H_2O + 6H_3BO_3 = Na_2B_{10}O_{16} \cdot 10H_2O + 9H_2O$$

All of the acids which may be used are at least as strong as or stronger than boric acid and other preferred species are sulfuric acid, hydrochloric acid, nitric acid, oxalic acid, phosphoric acid and sulfurous acid.

Where boric acid is used, it is preferably employed in a concentration of 2.5–3% boric acid with between 6 and 10% of the solution based upon the weight of the sodium tetraborate decahydrate being used. Where sulfuric acid is employed, between 6 and 10%, by weight, of a solution containing between 1 and 3% $H_2SO_4$ preferably is used. The other inorganic acids are preferably used in quantities of between about 6 and 10% of a 1 to 3% solution while the oxalic acid is preferably used as a 0.5 to 5% solution in quantities of between about 6 and 10% by weight.

When the sodium tetraborate decahydrate is derived from an alkaline solution, in turn prepared from naturally occurring salt, it will be found that quantities of impurities may be present and preliminary treatment, including washing, with water may be necessary before a filter cake may be obtained which is sufficiently low in various ionic species to be suitable for commercial use. The desirability of maintaining relatively low quantities of impurities militates against the use of various of the acids other than boric acid in many environments, although where the sodium tetraborate is to be used under circumstances which do not require a high degree of purity, the various less preferred acids may be used in the process.

An example of the practice of this invention is set forth below for illustrative purposes, but this is not to be interpreted as imposing limitations on the scope of the invention other than as set forth in the appended claims.

EXAMPLE I

Borax in the form of sodium tetraborate decahydrate was crystallized from a liquor which was prepared from Searles Lake brine, the brine having been treated previously to remove various materials other than the borax. After the borax had been allowed to crystallize to some extent, the slurry was centrifuged and a cake obtained which was washed with 13% water, based upon the cake weight. Various portions of the sample were then treated as noted in Table I below. The filter cakes obtained were stored for two weeks under weight. The characteristics of the various products are noted in Table II.

Table I
TEST CONDITIONS

| Test No. | $H_2O$ wash, seconds | $H_3BO_3$ wash, seconds | $H_3BO_3$ soln. conc., percent | lb. $H_2O$ per lb. cake | lb. $H_3BO_3$ soln. per lb. cake |
|---|---|---|---|---|---|
| 1 | 5 | 2 | 1.9 | 0.129 | 0.039 |
| 2 | 7.5 | 2 | 1.9 | 0.194 | 0.039 |
| 3 | 5 | 2 | 2.76 | 0.129 | 0.039 |
| 4 | 5 | 4 | 2.76 | 0.129 | 0.06 |
| 5 | 7.5 | 2 | 2.76 | 0.194 | 0.039 |
| 6 | 5 | 0 | 0 | 0.129 | 0 |

Table II
RESULTS OF LABORATORY CAKING TEST

| Sample No. | Assay as $Na_2B_4O_7 \cdot 10H_2O$ | Wt. loss in 12 days, percent | Caking index[1] | Remarks |
|---|---|---|---|---|
| 1 | 100.09 | 9.4 | 49 | 80% Caked; soft. |
| 2 | 100.03 | 12.7 | 17 | 40% Caked; soft lumps. |
| 3 | 100.38 | 7.7 | 11 | Do. |
| 4 | 99.99 | 0 | 0 | 100% free-flowing. |
| 5 | 99.83 | 5.5 | 0 | Do. |
| 6 (untreated) | 100.08 | 4.5 | 61 | 85% Caked; med. hard. |

[1] Caking index = 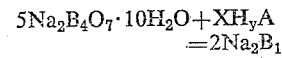

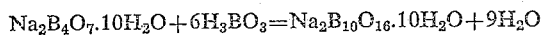

Screening time = 5 seconds (6 mesh).

The tests set forth above were conducted using quantities of acid solution in concentrations suitable for the production of optimum results. However, it has been found that much lower quantities of the acid may be used with results which are still far superior to those obtained where a plain water wash is used instead of the acid. For example, in another series of tests where untreated borax was found to be 50–70% caked when processed as was the untreated sample in the example above, and was found to have a caking index of 29, the borax washed with a 0.25% $H_3BO_3$ solution was found to be only 10% caked and had a caking index of 1.3. Substantially more concentrated acid solutions may also be used but with no improvement in results and hence the range of 0.5 to 5% is preferred.

Further tests were performed using additional acids. Results are set forth below.

EXAMPLE II

Various acids were substituted for the boric acid used in the tests described above, and the cakes formed when the sodium tetraborate decahydrate was centrifuged in a No. 5 Sharples centrifuge were washed with 10% (of the cake weight) of various solutions, air dried at room temperature, and tested under load for two weeks, according to the standard laboratory caking test. Results are set forth in Table III below.

*Table III–A*

COMPARISON OF SULFURIC, HYDROCHLORIC AND NITRIC ACID WASHES

| Sample No. | Wash solution | Wt. loss in 2 weeks (percent) | Caking index | Remarks |
|---|---|---|---|---|
| 1-A | None | 21.0 | 49.5 | 67% caked; medium hard. |
| 1-B | None | 20.8 | 50.5 | 64% caked; medium hard. |
| 2-A | 1% $H_2SO_4$ | 14.1 | 0 | Free-flowing. |
| 2-B | 1% $H_2SO_4$ | 13.6 | 0 | Do. |
| 3-A | 1.5% $H_2SO_4$ | 12.8 | 0 | 9% caked; very fragile. |
| 3-B | 1.5% $H_2SO_4$ | 12.2 | 0 | Do. |
| 4-A | 2% $H_2SO_4$ | 13.0 | 0 | 14% caked; fragile. |
| 4-B | 2% $H_2SO_4$ | 12.9 | 0 | Do. |
| 5-A | 3% $H_2SO_4$ | 11.5 | 0 | Free-flowing. |
| 5-B | 3% $H_2SO_4$ | 11.0 | 0 | <1% caked; very fragile. |
| 6-A | 1% HCl | 13.6 | 0 | 1% caked; very fragile. |
| 6-B | 1% HCl | 13.1 | 0 | Do. |
| 7-A | 2% HCl | 13.2 | 0 | 5% caked; very fragile. |
| 7-B | 2% HCl | 13.4 | 0 | Free-flowing. |
| 8-A | 2% $HNO_3$ | 13.9 | 0 | 9% caked; fragile. |
| 8-B | 2% $HNO_3$ | 14.4 | 0.5 | 10% caked; fragile. |

*Table III–B*

COMPARISON OF OXALIC ACID AND ACETIC ACID WASHES

| Sample No. | Wash solution | Wt. loss in 2 weeks (percent) | Caking index | Remarks |
|---|---|---|---|---|
| 1-A | None | 19.8 | 58.3 | 68% caked; medium hard. |
| 1-B | do | 20.4 | 55.7 | 67% caked; medium hard. |
| 2-A | 3% oxalic acid | 12.8 | 0 | Essentially free-flowing. |
| 2-B | do | 12.4 | 0 | Do. |
| 3-A | 3% acetic acid | 16.9 | 55.3 | 65% caked; hard lumps. |
| 3-B | do | 16.6 | 52.2 | 52% caked; hard lumps. |

*Table III–C*

COMPARISON OF PHOSPHORIC, CARBONIC AND SULFUROUS ACID WASHES

| Sample No. | Wash solution | Wt. loss in 2 weeks (percent) | Caking index | Remarks |
|---|---|---|---|---|
| 1 | None | 15.8 | 68 | 80% caked, medium hard. |
| 2 | $H_3PO_4$ | 6.2 | 26 | 60% caked, soft. |
| 3 | $H_2CO_3$ | 14.5 | 51 | 75% caked; medium hard. |
| 4 | $H_2SO_3$ | 6.7 | 0 | <10% small lumps, soft. |

Sulfuric acid wash was highly effective and may often be substituted for boric acid provided sulfate contamination (on the order of 0.1% sodium sulfate) is tolerable. Various savings in chemical and equipment cost can thus be realized.

Obviously many modifications and variations may be made without departing from the spirit and scope of this invention, and therefore only such limitations should be imposed as are indicated in the appended claims.

I claim:

1. A method for making hydrated sodium tetraborate free-flowing which comprises washing the same with an aqueous solution containing from about 0.5% to about 5% of an acid selected from the group consisting of mineral acids and oxalic acids, the aqueous acidic solution being employed in a quantity just sufficient to insure the production of a reaction product containing a major amount of particulate hydrated sodium tetraborate substantially coated with a minor amount of sodium pentaborate decahydrate.

2. A process for making crystalline sodium tetraborate decahydrate free-flowing which comprises contacting said tetraborate with from about 3% to 30%, by weight, based on the weight of tetraborate being treated, of an aqueous solution containing from about 0.5% to about 5% of an acid selected from the group consisting of mineral acids and oxalic acids, the said aqueous solution having a pH of less than 5.5, and recovering a crystalline free-flowing product which is substantially sodium tetraborate decahydrate.

3. A process for making crystalline sodium tetraborate decahydrate free-flowing which comprises contacting said tetraborate with from about 6% to 10%, by weight, based on the weight of tetraborate being treated, of an aqueous solution containing from about 2.5% to about 3% boric acid, the said aqueous solution having a pH of less than 5.5, and recovering a crystalline free-flowing product which is substantially sodium tetraborate decahydrate.

4. A process for making crystalline sodium tetraborate decahydrate free-flowing which comprises contacting said tetraborate with from about 6% to 10%, by weight, based on the weight of tetraborate being treated, of an aqueous solution containing from about 1% to about 3% sulfuric acid, the said aqueous solution having a pH of less than 5.5, and recovering a crystalline free-flowing product which is substantially sodium tetraborate decahydrate.

5. A process for making crystalline sodium tetraborate decahydrate free-flowing which comprises contacting said tetraborate with from about 6% to 10%, by weight, based on the weight of tetraborate being treated, of an aqueous solution containing from about 0.5% to about 5% of oxalic acid, the said aqueous solution having a pH of less than 5.5, and recovering a crystalline free-flowing product which is substantially sodium tetraborate decahydrate.

References Cited in the file of this patent

UNITED STATES PATENTS

| | | |
|---|---|---|
| 2,331,965 | Dreyfus | Oct. 19, 1943 |
| 2,969,275 | Garrett | Jan. 24, 1961 |
| 3,010,786 | Taylor et al. | Nov. 28, 1961 |

FOREIGN PATENTS

| | | |
|---|---|---|
| 540,852 | Belgium | Sept. 15, 1955 |

OTHER REFERENCES

Mellor: "Comprehensive Treatise on Inorganic and Theoretical Chemistry," Longmans, Green and Co., N.Y., vol. 5, pages 76 and 77 (1924).